US012639659B2

(12) United States Patent
Gupta et al.

(10) Patent No.: US 12,639,659 B2
(45) Date of Patent: May 26, 2026

(54) NODAL GRAPH AND REINFORCEMENT-LEARNING MODEL BASED SYSTEMS AND METHODS FOR MANAGING MOVING AGENTS

(71) Applicant: Toyota Motor Engineering & Manufacturing North America, Inc., Plano, TX (US)

(72) Inventors: Rohit Gupta, Santa Clara, CA (US); Akila Ganlath, Mountain View, CA (US); Nejib Ammar, San Jose, CA (US); Prashant Tiwari, Santa Clara, CA (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 317 days.

(21) Appl. No.: 17/869,042

(22) Filed: Jul. 20, 2022

(65) Prior Publication Data

US 2024/0029012 A1     Jan. 25, 2024

(51) Int. Cl.
*G06Q 10/083* (2024.01)
*G05D 1/00* (2024.01)

(52) U.S. Cl.
CPC ..... *G06Q 10/08355* (2013.01); *G05D 1/0221* (2013.01); *G05D 1/0291* (2013.01)

(58) Field of Classification Search
None
See application file for complete search history.

(56) References Cited

U.S. PATENT DOCUMENTS

| | | | |
|---|---|---|---|
| 9,242,799 B1 | 1/2016 | O'brien et al. | |
| 10,048,060 B1 | 8/2018 | Brazeau | |
| 11,466,997 B1 * | 10/2022 | Williams | .............. B64C 39/024 |

(Continued)

FOREIGN PATENT DOCUMENTS

| | | |
|---|---|---|
| CN | 101976414 A | 2/2011 |
| CN | 104036336 A | 9/2014 |
| WO | 2008153612 A2 | 12/2008 |

OTHER PUBLICATIONS

Sunil Chopra, et al., "Supply Chain Management: Strategy, Planning and Operation", Text Book, Fifth Edition, 2013, Pearson Education.

(Continued)

*Primary Examiner* — Jeff Zimmerman
*Assistant Examiner* — Jorge G Del Toro-Ortega
(74) *Attorney, Agent, or Firm* — Dinsmore & Shohl LLP

(57) ABSTRACT

A method for managing moving agents is provided. The method comprises identifying goods agents, moving agents, and a plurality of requests within a predetermined area, generating a nodal graph including the moving agents, requests, and goods as vertices and edges defining relations between two vertices, obtaining actions for the moving agents by inputting the nodal graph to a reinforcement-learning based graphical neural network model stored in the moving agents, the reinforcement-learning based graphical neural network outputs the action for the moving agent in response to receiving the nodal graph, and instructing the moving agents to operate based on the actions to satisfy at least one of the plurality of requests.

20 Claims, 4 Drawing Sheets

(56)                    References Cited

U.S. PATENT DOCUMENTS

| | | |
|---|---|---|
| 2001/0032029 A1 | 10/2001 | Kauffman |
| 2007/0112574 A1 | 5/2007 | Greene |
| 2017/0269607 A1 | 9/2017 | Fulop |
| 2018/0247404 A1 | 8/2018 | Goyal et al. |
| 2019/0243644 A1 | 8/2019 | Jose et al. |
| 2020/0259868 A1 | 8/2020 | Lang et al. |
| 2020/0409376 A1 | 12/2020 | Ebrahimi Afrouzi et al. |
| 2021/0117919 A1 | 4/2021 | Paulson et al. |
| 2021/0142283 A1* | 5/2021 | Rusnak ............ G06Q 10/08345 |
| 2021/0357422 A1 | 11/2021 | Cella et al. |
| 2022/0023742 A1 | 1/2022 | Tran et al. |

OTHER PUBLICATIONS

Edward Elson Kosasih, et al., A Machine Learning Approach for Predicting Hidden Links in Supply Chain with Graph Neural Networks, International Journal of Production Research, Jul. 2021.

* cited by examiner

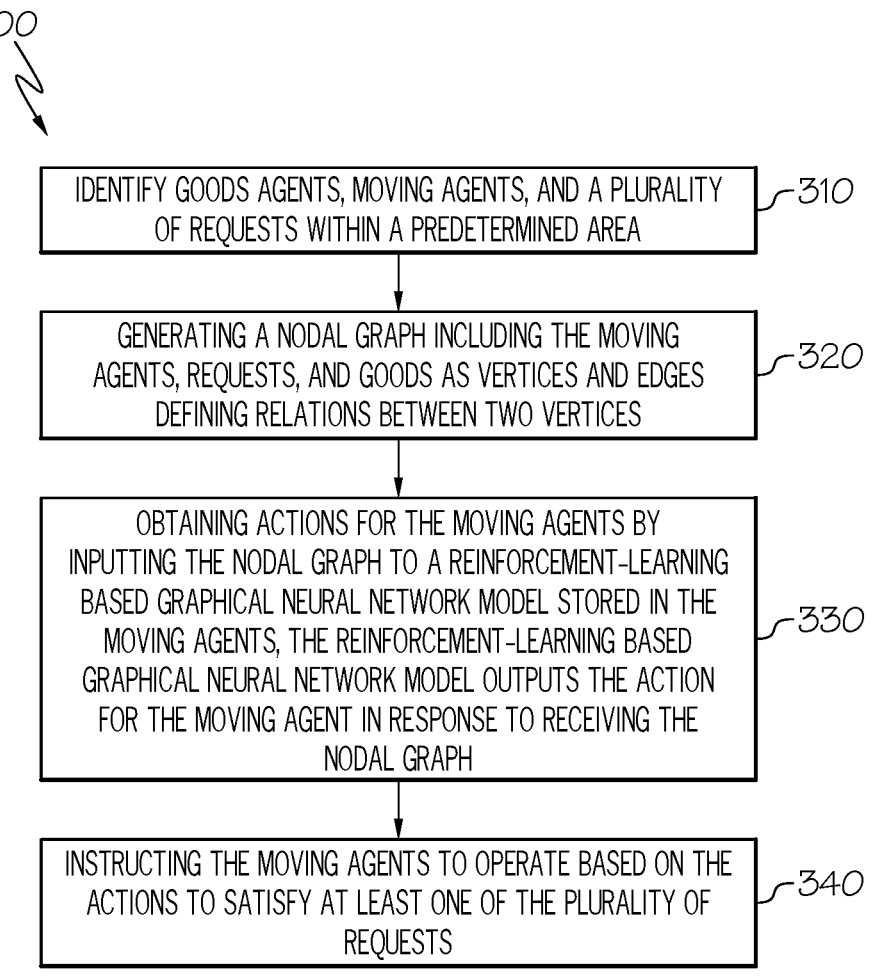

*300*

| |
|---|
| IDENTIFY GOODS AGENTS, MOVING AGENTS, AND A PLURALITY OF REQUESTS WITHIN A PREDETERMINED AREA |

*310*

| |
|---|
| GENERATING A NODAL GRAPH INCLUDING THE MOVING AGENTS, REQUESTS, AND GOODS AS VERTICES AND EDGES DEFINING RELATIONS BETWEEN TWO VERTICES |

*320*

| |
|---|
| OBTAINING ACTIONS FOR THE MOVING AGENTS BY INPUTTING THE NODAL GRAPH TO A REINFORCEMENT-LEARNING BASED GRAPHICAL NEURAL NETWORK MODEL STORED IN THE MOVING AGENTS, THE REINFORCEMENT-LEARNING BASED GRAPHICAL NEURAL NETWORK MODEL OUTPUTS THE ACTION FOR THE MOVING AGENT IN RESPONSE TO RECEIVING THE NODAL GRAPH |

*330*

| |
|---|
| INSTRUCTING THE MOVING AGENTS TO OPERATE BASED ON THE ACTIONS TO SATISFY AT LEAST ONE OF THE PLURALITY OF REQUESTS |

NODAL GRAPH AND REINFORCEMENT-LEARNING MODEL BASED SYSTEMS AND METHODS FOR MANAGING MOVING AGENTS

TECHNICAL FIELD

The embodiments described herein generally relates to managing moving agents, and more particularly, to generating a nodal graph, obtaining actions for the moving agents by inputting the nodal graph into a reinforcement-learning based graphical neural network model, and instructing the moving agents to operate based on the obtained actions in order to satisfy a plurality of requests.

BACKGROUND

The efficient and timely transportation of goods presents numerous logistical challenges. For example, transportation companies may invest in a particular number of vehicles in anticipation of transporting and storing various goods, chart routes for the efficient transportation of these goods, generate a logistical supply chain, and make adjustments to delivery schedules based on sudden spikes of reductions in the supply and demand of goods. Conventionally, the charting of routes, the modification of logistical supply chains, and various decisions that are taken to address shortages due to demand and supply spikes are based on a centralized supply chain infrastructure. Centralized supply chain infrastructure and strategies fail to adequately address demand and supply spikes, goods shortages, goods delivery delays, and so forth, because such infrastructures typically have a single point of failure and rely heavily on making decisions using a centralized planning entity.

Accordingly, a need exists for a logistical supply chain system that relies on decentralized decision making for the purpose of facilitating efficient and timely transportation of goods to various locations.

SUMMARY

In one embodiments, a method for moving agents is provided. The method comprises identifying goods agents, moving agents, and a plurality of requests within a predetermined area, generating a nodal graph including the moving agents, requests, and goods as vertices and edges defining relations between two vertices, obtaining actions for the moving agents by inputting the nodal graph to a reinforcement learning based graphical neural network model stored in one of the moving agents, the reinforcement learning based graphical neural network outputs the action for the moving agent in response to receiving the nodal graph, and instructing the moving agents to operate based on the actions to satisfy at least one of the plurality of requests.

In one embodiment, a system for managing moving agents is provided. The system comprises controllers associated with the moving agents such that the controllers are configured to identify goods agents and a plurality of requests within a threshold radius of the moving agents, determine one or more costs in association with the moving agents and the goods agents and the plurality of requests, generate a respective nodal graph specific to each of the moving agents, apply a reinforcement learning based graphical neural network model to each respective nodal graph of the moving agents, and instruct one or more of the moving agents to satisfy at least one of the plurality of requests responsive to the applying of the reinforcement learning based graphical neural network model.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3 depicts a flowchart describing operation of the moving agent motion management system, according to one or more embodiments described and illustrated herein.

DETAILED DESCRIPTION

Conventional goods transport techniques suffer from numerous deficiencies. In particular, these techniques rely on a centralized decision making authority, which often creates inefficiencies due to the existence of a single point of failure. In particular, due to reliance on a centralized decision making authority, the ability of the goods transport techniques to address and overcome the adverse effects caused by delays, shortages, and spikes in demand and supply is limited. In particular, the centralized decision making authority may lack the decision making speed for addressing and overcoming such adverse effects.

The moving agent motion management system of the present disclosure addresses and overcome these concerns. In particular, the moving agent motion management system implements a decentralized decision making process that generates a nodal graph that includes data associated with moving agents, requests, and goods. The nodal graph includes a detailed and comprehensive enumeration of proximity based relationships between a moving agent and one or more neighboring moving agents, requests, and goods. Such a comprehensive nodal graph is fed as input into a reinforcement learning based graphical neural network (a.k.a. "RL-GNN") that obtains one or more actions for one or more of the moving agents to perform for the purpose of satisfying one or more of a plurality of requests. Thereafter, one or more controllers associated with the one or more moving agents may instruct the moving agents to operate based on the obtained actions in order to satisfy at least one of the plurality of requests.

Figure 1:
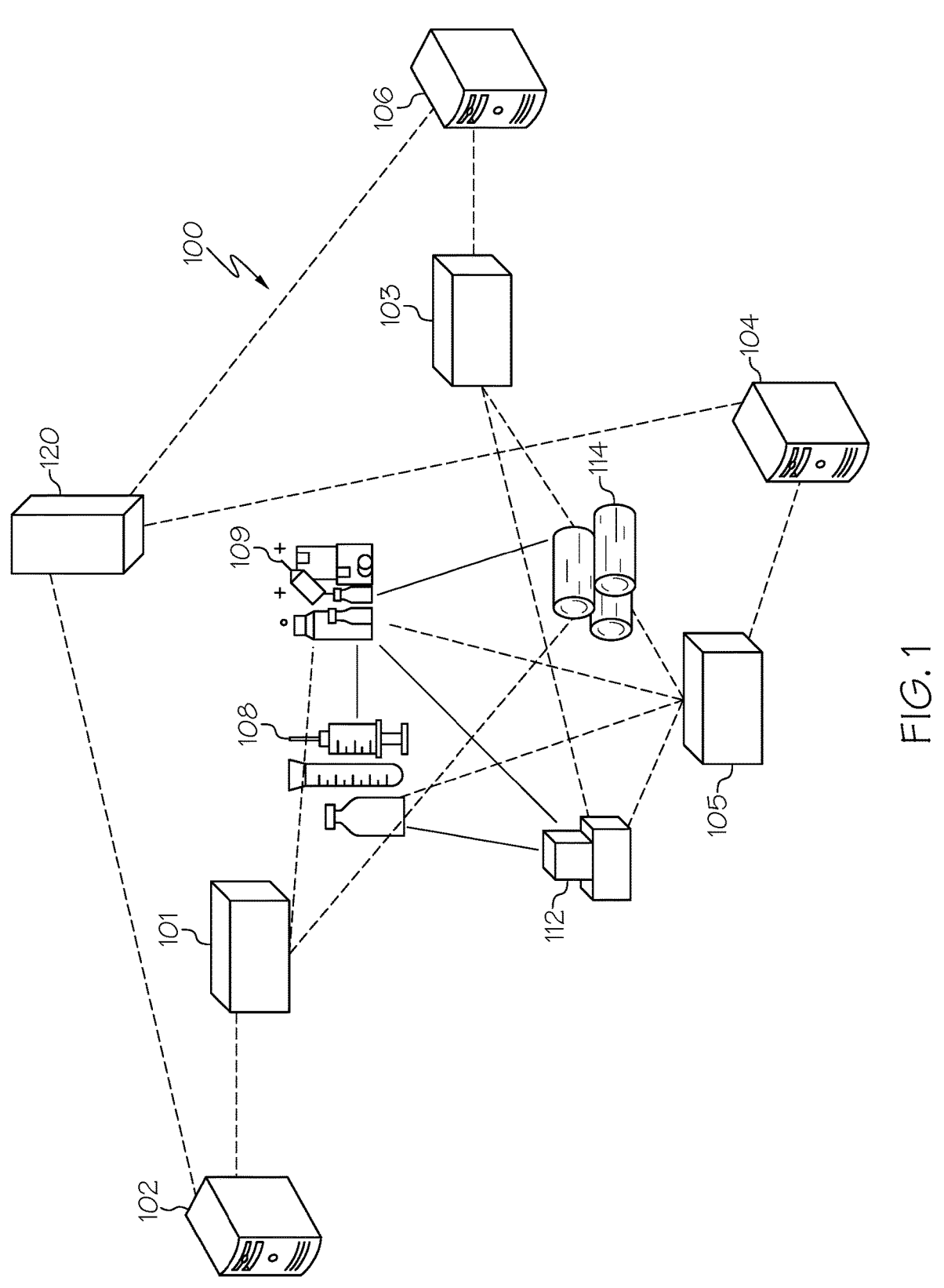
FIG. 1 depicts an example graphical representation of aspects of the moving agent motion management system of the present disclosure, according to one or more embodiments described and illustrated herein.

FIG. 1 depicts an example graphical representation of aspects of the moving agent motion management system 100 of the present disclosure, according to one or more embodiments described and illustrated herein. The example moving agent motion management system 100 implements a decentralized decision making process for enabling the transportation of goods to various locations. In embodiments, the moving agent motion management system 100 includes a plurality of moving agents 101, 103, and 105 and a server 120. Each of the plurality of moving agents 101, 103, and 105 includes example controllers 102, 104, and 106, respectively. Each of the moving agents 101, 103, and 105 may be a vehicle including an automobile or any other passenger or non-passenger vehicle such as, for example, a terrestrial, aquatic, and/or airborne vehicle. In some embodiment, one or more of the mobile units 130, 140 may be an unmanned aerial vehicle (UAV), commonly known as a drone, that may be able to deliver relatively small and light items.

Each of the moving agents 101, 103, and 105 may be an autonomous and connected vehicle that navigates its environment with limited human input or without human input. Each of the moving agents 101, 103, and 105 may be equipped with internet access and share data with other devices both inside and outside the moving agents 101, 103, and 105. Each of the moving agents 101, 103, and 105 may communicate with an edge device or a server and transmits its data to the edge device or the server. For example, each of the moving agents 101, 103, and 105 transmits information about its current location and destination, information about the mobile structure that it is currently carrying, information about a task that it is currently implementing, and the like. Each of the moving agents 101, 103, and 105 may include an actuator such as a motor, an engine, and any other powertrain that drives the moving agents 101, 103, and 105.

In particular, in embodiments, the moving agent 101 includes an example controller 102, the moving agent 103 includes an example controller 104, and the moving agent 105 includes an example controller 106. Further, the example graphical representation illustrates a connection between each of the plurality of moving agents 101, 103, and 105 and example items 108, 109, 112, and 114. Such example items may relate to medical and pharmaceutical supplies, lumber, containers, and so forth. It is noted that a plurality of other items are also contemplated.

In embodiments, the moving agent motion management system 100 of the present disclosure enables the satisfaction of one or more of a plurality of requests, namely requests for the pickup, delivery, and storage of various goods, using a decentralized decision making process. In particular, in embodiments, the example controllers 102, 104, and 106 of the plurality of moving agents 101, 103, and 105 generates nodal graphs that include a robust and detailed proximity relationship between moving agents, requests, and goods as part of a local or global supply chain. In embodiments, a particular nodal graph may be generated that is particular or specific to each of the plurality of example controllers 102, 104, and 106. These nodal graphs may be input into a reinforcement-learning based graphical neural network model that is implemented by each of the example controllers 102, 104, and 106 in real time.

Each of the controllers 102, 104, and 106 may store a reinforcement-learning based graphical neural network model. In embodiments, the model may receive these nodal graphs and output a set of actions to be performed that is customized to each moving agent. For example, one moving agent may have the ability to perform actions to satisfy a subset of the plurality of requests, while another moving agent may have the ability to perform a different set of actions to satisfy a different subset of the plurality of requests. In some embodiments, an edge device or a server may store a reinforcement-learning based graphical neural network model. The edge device or the server may input a nodal graph representing relations among the moving agents, requests, and good to a reinforcement-learning based graphical neural network model and obtain a set of actions for the moving agents. The edge device or the server may transmit the section of actions to the moving agents. The moving agent motion management system 100 may utilize the nodal graphs and the output from the reinforcement-learning based graphical neural network model to transport and store goods in a timely and efficient manner.

The server 120 may be communicatively coupled to the controllers 102, 104, and 106. The server 120 may store a reinforcement-learning based graphical neural network model. The server 120 may store information about a plurality of requests, information about the moving agents 101, 103, 105 such as current locations, goods that the moving agents 101, 103, 105 are currently carrying, and information about requests.

Figure 2:
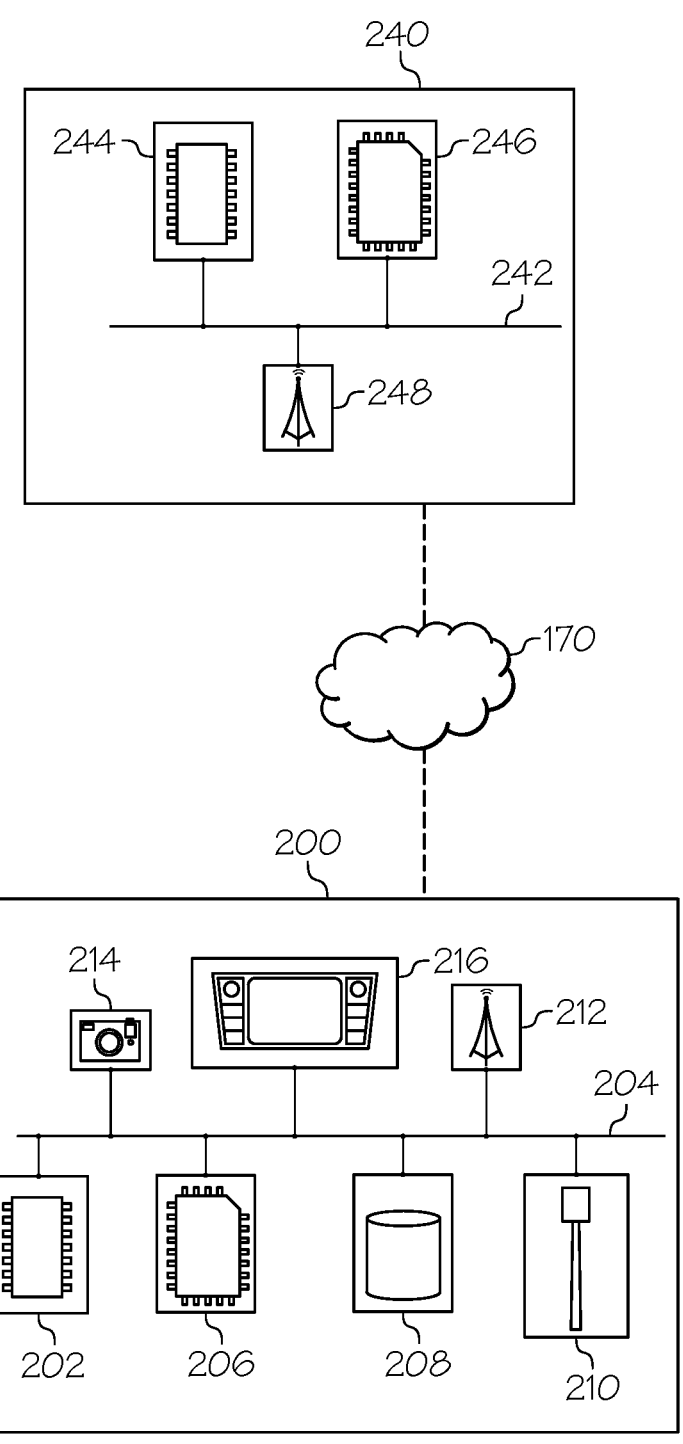
FIG. 2 schematically depicts non-limiting components of the devices of the present disclosure, according to one or more embodiments described and illustrated herein.

FIG. 2 schematically depicts non-limiting components of the devices of present disclosure, according to one or more embodiments described and illustrated herein. In particular, FIG. 2 schematically depicts a moving agent system 200, according to one or more embodiments described and illustrated herein that may be included as part of each of the moving agents 101, 103, and 105 illustrated in FIG. 1 and described above. The moving agent system 200 may be installed as part of autonomous vehicle or human operated intelligent vehicle.

The moving agent system 200 may include a controller 202. The controller 202 may be any device capable of executing machine readable and executable instructions. Accordingly, the controller 202 may be an integrated circuit, a microchip, a computer, or any other computing device. The controller 202 may serve the role of a decision making module that is powered by or which implements a reinforcement learning based graphical neural network model as described in the present disclosure, which obtains various actions that may be performed to satisfy one or more of a plurality of requests.

The controller 202 may be coupled to a communication path 204 that provides signal interconnectivity between various modules of the moving agent system 200. Accordingly, the communication path 204 may communicatively couple any number of processors (e.g., comparable to the controller 202) with one another, and allow the modules coupled to the communication path 204 to operate in a distributed computing environment. Specifically, each of the modules may operate as a node that may send and/or receive data. As used herein, the term "communicatively coupled" means that the coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The moving agent system 200 may include one or more memory modules 206, which is coupled to the communication path 204. The one or more memory modules 206 may comprise RAM, ROM, flash memories, hard drives, or any device capable of storing machine readable and executable instructions such that the machine readable and executable instructions can be accessed by the controller 202. The machine readable and executable instructions may comprise logic or algorithm(s) written in any programming language of any generation (e.g., 1GL, 2GL, 3GL, 4GL, or 5GL) such as, for example, machine language that may be directly executed by the controller 202 or assembly language, object-oriented programming (OOP), scripting languages, microcode, etc., that may be compiled or assembled into machine readable and executable instructions and stored on the one or more memory modules 206. Data relating to the moving agents may be stored such as, e.g., primary moving agent designations, secondary moving agent designations, locations of a particular moving agent, and a number of goods that may be carried by a particular moving agent at a given time. Further, data relating to goods carried by moving agents may also be stored, namely data relating to an origin location, a destination, a number of the carried goods, waiting duration, current travel time, shortest travel duration, scheduled travel duration, wait delay tolerance, travel delay tolerance, and so forth.

Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. The memory modules 206 may also store GPS data.

The moving agent system 200 may include one or more sensors 208. Each of the one or more sensors 208 are coupled to the communication path 204 and communicatively coupled to the controller 202. The one or more sensors 208 may include one or more motion sensors for detecting and measuring motion. The motion sensors may include inertial measurement units. Each of the one or more motion sensors may include one or more accelerometers and one or more gyroscopes. The one or more sensors may also include a microphone, a motion sensor, a proximity sensor, and so forth. The sensors 208 may be able to detect the proximity of one or more devices and initiate the transmission to data (e.g., digital authorization data) upon detecting these devices (e.g., smartphones of various users) within a certain proximity from these sensors.

Still referring to FIG. 2, the moving agent system 200 includes a satellite antenna 210 coupled to the communication path 204 such that the communication path 204 communicatively couples the satellite antenna 210 to other modules of the moving agent system 200. The satellite antenna 210 is configured to receive signals from global positioning system satellites. Specifically, in one embodiment, the satellite antenna 210 includes one or more conductive elements that interact with electromagnetic signals transmitted by global positioning system satellites. The received signal is transformed into a data signal indicative of the location (e.g., latitude and longitude) of the satellite antenna 210 or an object positioned near the satellite antenna 210 by the controller 202. The location information may be include the data regarding the location of the one or more mobile devices.

The moving agent system 200 may include network interface hardware 212 for communicatively coupling the moving agent system 200 with the moving agents systems installed as part of other moving agents, e.g., via a communication network (not shown). For example, the moving agent 101 may communicate with other moving agents such as moving agents 103 and 105 in FIG. 1 via a communication network. The network interface hardware 212 is coupled to the communication path 204 such that the communication path 204 communicatively couples the network interface hardware 212 to other modules of the moving agent system 200. The network interface hardware 212 may be any device capable of transmitting and/or receiving data via a wireless network, e.g., the communication network. Accordingly, the network interface hardware 212 may include a communication transceiver for sending and/or receiving data according to any wireless communication standard. For example, the network interface hardware 212 may include a chipset (e.g., antenna, processors, machine readable instructions, etc.) to communicate over wireless computer networks such as, for example, wireless fidelity (Wi-Fi), WiMax, Bluetooth®, IrDA, Wireless USB, Z-Wave, ZigBee, or the like. In some embodiments, the network interface hardware 212 includes a Bluetooth® transceiver that enables the moving agent system 200 to transmit and receive information via Bluetooth®.

The network interface hardware 212 may utilize various communication protocols. For example, in embodiments, the network interface hardware 212 may utilize a communication protocol that enables communication the moving agents 101, 103, and 105. Compatibility with other comparable communication protocols are also contemplated.

It is noted that communication protocols include multiple layers as defined by the Open Systems Interconnection Model (OSI model), which defines a telecommunication protocol as having multiple layers, e.g., Application layer, Presentation layer, Session layer, Transport layer, Network layer, Data link layer, and Physical layer. To function correctly, each communication protocol includes a top layer protocol and one or more bottom layer protocols. Examples of top layer protocols (e.g., application layer protocols) include HTTP, HTTP2 (SPDY), and HTTP3 (QUIC), which are appropriate for transmitting and exchanging data in general formats. Application layer protocols such as RTP and RTCP may be appropriate for various real time communications such as, e.g., telephony and messaging. Additionally, SSH and SFTP may be appropriate for secure maintenance, MQTT and AMQP may be appropriate for status notification and wakeup trigger, and MPEG-DASH/HLS may be appropriate for live video streaming with user-end systems. Examples of transport layer protocols that are selected by the various application layer protocols listed above include, e.g., TCP, QUIC/SPDY, SCTP, DCCP, UDP, and RUDP.

The moving agent system 200 also includes a camera 214. The camera 214 may have any resolution. In some embodiments, one or more optical components, such as a mirror, fish-eye lens, or any other type of lens may be optically coupled to the camera 214. In embodiments, the camera may have a broad angle feature that enables capturing digital content within a 150 degree to 180 degree arc range. Alternatively, the camera 214 may have a narrow angle feature that enables capturing digital content within a narrow arc range, e.g., 60 degree to 90 degree arc range. In embodiments, the one or more cameras may be capable of capturing high definition images in a 720 pixel resolution, a 1080 pixel resolution, and so forth.

In embodiments, the moving agent system 200 may include a display 216 for providing visual output. The display 216 may output digital data, images and/or a live video stream of various types of data. The display 216 are coupled to the communication path 204. Accordingly, the communication path 204 communicatively couple the display 216 to other modules of the moving agent system 200, including, without limitation, the controller 202 and/or the one or more memory modules 206. The display 216 may be configured to display digital authorization data, distress messages, and so forth.

The server 240 includes one or more processors 244, one or more memory modules 246, a network interface hardware 248, one or more vehicle sensors 250, and a communication path 242 communicatively connected to the other components of the moving agent system 200. The components of the server 240 may be structurally similar to and have similar functions as the corresponding components of the moving agent system 200 (e.g., the one or more processors 244 corresponds to the controller 202, the one or more memory modules 246 corresponds to the one or more memory modules 206, the communication path 242 corresponds to the communication path 204, and the network interface hardware 248 corresponds to the network interface hardware 212). The one or more memory modules 246 may store a reinforcement-learning based graphical neural network model. The one or more memory modules 246 may also store information about a plurality of requests, information about moving agents, and information about requests.

FIG. 3 depicts a flowchart 300 describing operation of the moving agent motion management system 100, according to one or more embodiments described and illustrated herein. In embodiments, at block 310, a controller of a moving agent may identify goods agents, moving agents, and a plurality of requests within a predetermined area. The controller of the moving agent may obtain information about goods agents, for example, locations about the goods agents, amounts of goods. For example, by referring to FIG. 1, the information about goods agents may be stored in the server 120 and the controller 102 of the moving agent 101 may receive the information about goods agents from the server 120. Specifically, the controller 102 of the moving agent 101 may receive locations of the goods and the amount of goods from the server 120. The goods may be carried by one of the moving agents 101, 103, 105, or located at other place where moving agents 101, 103, 105 can pick up. As illustrated in FIG. 1 and described above, goods may be items such as, e.g., lumber, electronics, semiconductors, medical and pharmaceutical supplies, and so forth. In short, the goods may refer to any merchandise or items that may be transported from one location to another.

The controller of the moving agent may obtain information about moving agents, e.g., locations of the moving agents, current tasks of the moving agents, vacancy of the moving agents. For example, by referring to FIG. 1, the controller 102 of the moving agent 101 may receive information about other moving agents, e.g., moving agents 103 and 105 from the server 120 or directly from the moving agents 103 and 105 via wireless communication.

The controller of the moving agent may obtain information about the plurality of requests. For example, by referring to FIG. 1, the information about the plurality of requests may be stored in the server 120 and the controller 102 of the moving agent 101 may receive the information about the plurality of requests from the server 120.

Moving agents generally describes vehicles, machines, mobile spaces, and so forth, that facilitate and assist the transport of goods from one location to another. Additionally, as stated, each of the moving agents may include the controller 202 that implement and utilize reinforcement learning based graphical neural network model to satisfy at least a subset of the plurality of requests. In embodiments, the controller 202 of one or more moving agents may identify goods agents, moving agents, and a plurality of requests within a predetermined area. In other words, a mobile space, a vehicle that is designated for transport, and so forth, may identify one or more additional mobile spaces and/or one or more additional vehicles within a particular proximity. In embodiments, it is noted that the moving agents may be autonomous vehicles or human operated intelligent vehicle. In embodiments, the moving agents may transport mobile storage spaces associated with various dimensions.

Figure 4:
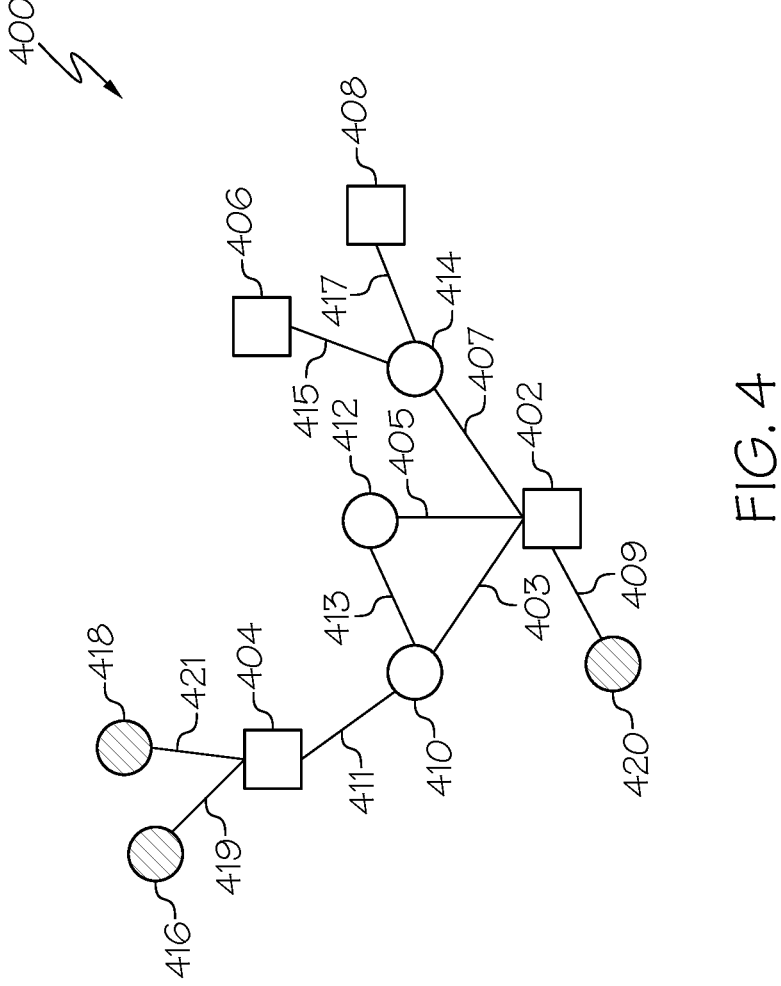
FIG. 4 depicts an example of the nodal graph as described in the present disclosure, according to one or more embodiments described and illustrated here.

In embodiments, at block 320, the controller may generate a nodal graph including the moving agents, requests, and goods as vertices and edges defining relations between two vertices. As illustrated in FIG. 4 and described in greater detail below, the controller 202 may generate a nodal graph including the moving agents, requests, and goods as vertices and edges defining relationships between these vertices. In embodiments, the nodal graph may serve as an input for the reinforcement-learning based graphical neural network model described in the present disclosure. In embodiments, the generated nodal graph may be output on a display associated with one or more computing devices that may be controlled by the controller 202. In embodiments, the generated nodal graph may include and illustrate a robust and detailed proximity relationship between moving agents, requests, and goods. The generated nodal graph with such a detailed proximity relationship between the moving agents may be input into the reinforcement-learning based graphical neural network model, which may facilitate an accurate and efficient fulfillment of one or more of the plurality of requests.

In embodiments, the reinforcement-learning based graphical neural network model may have been trained, using training data sets, to output actions for moving agents that can fulfill as many requests as possible while reducing delays of fulfilling requests and matching costs of all users. The training data sets include nodal graphs, actions for moving agents, delays of fulfilling requests and matching costs. Delays and matching costs are calculated using the equation below.

$$\sum_{v}\sum_{p \in O_v} T_{vp} + \sum_{r \in W_v} T_r + C_M(O_v, W_v) \qquad \text{Equation 1}$$

In the above function, the terms $T_{vp}$, $T_r$, and $C_M(O_v, W_v)$ are associated with freight delays, scheduled request delays, and personal preference matching costs, respectively. $O_v$ represents goods, and $W_v$ represents future requests. It is further noted that each of the delays may be determined based on a sum of the waiting time, a travel delay amount associated with or due to supply and demand factors related to various goods and the locations of the respective moving agents. For example, weather conditions, complexity of travel routes, governmental regulations and permissions, and so forth, may be a few of the example factors that contribute to the delays.

In some embodiments, a constraint algorithm may also be implemented by the one or more controllers, which may limit, trim, or modify the generated nodal graph associated with one or more moving agents. As a result, the ability of a particular moving agent to assist in the performing of one or more actions that may result in the satisfaction or completion of one or more requests may be limited. In embodiments, the constraint algorithm, implemented by the one or more controllers, may be represented by:

$$t_i^{pickup} - t_i^{req} \le T_i^{max\,wait}, t_i^{sch,avi} - t_i^{exp,avi} \le T_i^{max\,travel} \qquad \text{Equation 2}$$

$$t_i^{pickup}$$

represents time of pickup, $$t_i^{req}$$

represents the time of request, $$T_i^{max}$$

wait represents a maximum allowable wait time.

$$t_i^{sch\_avl}$$

represents a scheduled arrival time and $$t_i^{exp\_avl}$$

represents an expected arrival time, and $$T_i^{max\,travel}$$

represents a maximum allowable travel time.

In embodiments, at block 330, the controller may obtain actions for moving agents by inputting the nodal graph to a reinforcement-learning based graphical neural network model stored in the moving agents. For example, the nodal graph illustrated in FIG. 4 is input to the trained reinforcement-learning based graphical neural network model and output actions for moving agents. In embodiments, the reinforcement learning based graphical neural network model outputs actions that maximize a number of requests to be satisfied by one or more moving agents. Specifically, because the reinforcement-learning based graphical neural network model is trained to output actions for moving agents that fulfill as many request as possible while reducing delays and matching cost of all users, the actions output by the reinforcement-learning based graphical neural network model allow the moving agents 402, 404, 406 to fulfill as many requests as possible. Further, the reinforcement learning based graphical neural network model outputs actions that minimize delays associated with the satisfaction of at least one of a plurality of requests, namely a sum of freight delays, scheduled requests delays, and preference costs.

For example, as stated above, the generated nodal graph details a proximity based relationship using vertices and edges as markers. In embodiments, the vertices are associated with goods and the edges are associated with relationships between the vertices, namely the goods associated with the respective vertices. In embodiments, it is noted that the robust, detailed, and comprehensive proximity relationship included as part of the nodal graph that is input into the reinforcement-learning based graphical neural network model enables the controller to satisfy one or more of the plurality of requests in a timely and efficient matter. As a result, in embodiments, when implemented as part of a local or global supply chain, the moving agent motion management system 100 as described in the present disclosure serves to streamline the supply chain, ease shortages, and ensure that goods are delivered to number of locations in an efficient and cost effective manner.

In embodiments, at block 340, the controller instructs the moving agents to operate based on the actions to satisfy at least one of the plurality of requests. In embodiments, the controller 202 may analyze the actions obtained for the moving agents that are output by reinforcement-learning based graphical neural network model and perform one or more actions, automatically and without user intervention, for the purpose of satisfying one or more of the plurality of requests. In particular, the controller 202 may initiate and control movement of one or more of the moving agents based, in part, based on the proximity relationship between the moving agents and one or more additional moving agents within a particular proximity, and goods of various types and dimensions across various distances and using various mobile storage spaces, vehicles, and so forth. For example, by referring to FIG. 1, the moving agents 101, 103, and 105 may operate their actuators such as a motor, an engine, and any other powertrain that drives the moving agents 101, 103, and 105 according to the actions to fulfill requests. In embodiments, examples of requests that may be satisfied include transporting and dropping off goods at a particular destination, picking up goods from a particular location, storing goods within one or more locations within the one or more moving agents, and so forth. Additionally, in embodiments, if a particular moving agent does not include any goods and is not in the process of performing an action (e.g., traveling to a particular location to pick up a good or deliver a good), the moving agent may be designated as idle. In such an operating condition, the moving agent motion management system 100 as described herein may utilize and instruct the moving agent in the idle position to perform one or more actions related to the satisfaction of one or more of the plurality of requests.

In some embodiments, by referring to FIG. 1, the server 120 instead of one of the moving agents 101, 103, 105 may generate a nodal graph and obtains actions for moving agents 101, 103, 105 based on the nodal graph and a trained reinforcement-learning based graphical neural network model. Then, the server 120 transmits the actions to the moving agents 101, 103, 105. In some embodiments, the server 120 may receive actions obtained by the moving agents 101, 103, 105 from the moving agents 101, 103, 105, respectively. If the actions obtained by the moving agents 101, 103, 105 are conflicting with each other, for example, the actions obtained by the moving agent 101 conflict with the actions obtained by the moving agent 103, the server 120 may determine which actions should be prioritized based on various factors including expected delays and matching costs for the actions.

FIG. 4 depicts an example of the nodal graph as described in the present disclosure, according to one or more embodiments described and illustrated here. As illustrated in FIG. 4, an example nodal graph 400 may be generated by a controller (not shown) of an example primary moving agent 402, e.g., an autonomous vehicle or a human operated vehicle. The controller of the example primary moving agent 402 may generate a partial nodal graph or the example nodal graph 400 that is specific to the example primary moving agent 402 such that the example nodal graph 400 details various goods, requests, and a number of additional moving agents within a particularly proximity of the example primary moving agent 402. For example, the partial nodal graph includes only moving agents, goods, and request that are within a predetermined area.

It is noted, as the example nodal graph 400 is generated by the controller of the example primary moving agent 402, the example nodal graph 400 designates the moving agent in which the controller is positioned as the example primary moving agent 402 and generates a plurality of edges and vertices with the example primary moving agent 402 serving as a focal point. For example, in embodiments, as illustrated in FIG. 4, the square boxes may indicate the moving agents, namely example secondary moving agents 404, 406, and 408. Additionally, as illustrated in FIG. 4, the black circles may represent requests, and circles with slashes may represent goods 416, 418, and 420. In embodiments, the lines connecting the various boxes and circles together are representative of edges. In embodiments, a plurality of edges may emerge from an icon that is representative of a primary moving agent and these edges may be associated with goods, requests, and so forth, which in turn may be associated with a plurality of neighboring moving agents. A nodal graph may have different types of edges: a request to request edge, a request to moving agent edge, and a moving agent to goods edge. The request to request edge indicates that a virtual moving agent starting at one request location can full fill both requests. The request to moving agent edge indicates that a moving agent can fulfill its current goods and the request without violating constraints, e.g., the constraints of Equation 2 above. The moving agent to goods edge indicates that the moving agent carries the goods or that the moving agent can pick up the goods.

In particular, illustrated in FIG. 4, an example nodal graph 400 designates example primary moving agent 402 as a focal point. The primary moving agent 402 includes four edges 403, 405, 407, and 409 that extend from the primary moving agent 402. The edge 409 extends outwards and connects to an example good 420, while the remaining three edges 403, 405, 407 extend outwards and connect to requests 410, 412 and 414. Each of the requests 410, 412, and 414 includes detailed information about the corresponding request including, but not limited to, the origin of goods, the destination of goods, the number of goods, the type of goods, wait duration of the goods, a shortest travel duration, a wait delay tolerance for the goods, a travel delay tolerance for the goods. The request 410 includes an edge 413 that extends outwards and connects to request 412 and another edge 411 that extends outwards and connects to the example secondary moving agent 404. The example secondary moving agent 404 includes edges 419 and 421 that extend outwards and connect to goods 416 and 418. Further, the request 414 includes edges 415 and 417 that extend outwards and connect to two different secondary moving agents 406 and 408 (e.g., neighboring moving agents).

In embodiments, as stated above, it is noted that the example nodal graph 400 may store data in association with the vertices that is related to a number of passengers that may be traveling in or transported by each of the example primary moving agent 402 and the example secondary moving agents 404, 406, and 408. Vertices may be associated with or representative of requests, moving agents, or goods. In embodiments, various types of data may be stored in association with the request, namely data that relates to an origin or start location, a destination, number and type of goods, waiting duration, shortest travel duration, waiting delay tolerance, travel delay tolerance, and so forth. Data relating to the moving agents may also be stored such as, e.g., primary moving agent designation, secondary moving agent designation, location of a particular moving agent, and a number of goods that may be carried by a particular moving agent at a given time. Further, data relating to goods carried by moving agents may also be stored, namely data relating to an origin location, a destination, a number of the carried goods, waiting duration, current travel time, shortest travel duration, scheduled travel duration, wait delay tolerance, travel delay tolerance, and so forth. In embodiments, various permutations and combinations of edges and vertices are contemplated such that edges may connect any two requests, a request with a moving agent, or a moving agent with a good. In short, vertices may be associated with or representative of requests, moving agents, or goods.

It should now be understood that the embodiments of the present disclosure are directed to a method for managing moving agents. The method comprises identifying goods agents, moving agents, and a plurality of requests within a predetermined area, generating a nodal graph including the moving agents, requests, and goods as vertices and edges defining relations between two vertices, obtaining actions for the moving agents by inputting the nodal graph to a reinforcement-learning based graphical neural network model stored in the moving agents, the reinforcement-learning based graphical neural network outputs the action for the moving agent in response to receiving the nodal graph, and instructing the moving agents to operate based on the actions to satisfy at least one of the plurality of requests.

In a first aspect, a method for managing moving agents comprises identifying goods agents, moving agents, and a plurality of requests within a predetermined area, generating a nodal graph including the moving agents, requests, and goods as vertices and edges defining relations between two vertices, obtaining actions for the moving agents by inputting the nodal graph to a reinforcement-learning based graphical neural network model stored in the moving agents, the reinforcement-learning based graphical neural network outputs the action for the moving agent in response to receiving the nodal graph, and instructing the moving agents to operate based on the actions to satisfy at least one of the plurality of requests.

In a second aspect, the method of the first aspect, wherein the moving agents are autonomous vehicle or human operated intelligent vehicles.

In a third aspect, the method of the first or the second aspect, wherein the reinforcement learning based graphical neural network outputs the actions that maximize a number of requests to be satisfied by the moving agents.

In a fourth aspect, the method of any of the first to the third aspects, wherein the edges include a first edge between the vertex of a moving agent and the vertex of a request.

In a fifth aspect, the method of any of the first to the fourth aspects, wherein the edges include a second edge between the vertex of a request and a vertex of an additional request, the second edge indicating that a moving agent can fulfill both the request and the additional request.

In a sixth aspect, the method of any of the first to the fifth aspects, wherein the edges include at least one third edge between the vertex of a moving agent and a vertex of a goods agent.

In a seventh aspect, the method of any of the first to the sixth aspects, wherein the reinforcement learning based graphical neural network outputs the actions that minimize a sum of freight delays, scheduled requests delays, and preference costs.

In an eighth aspect, the method of any of the first to the seventh aspects, further comprising trimming the nodal graph based on constraints on goods of the goods agents and services of the requests.

In a ninth aspect, the method of the eighth aspect, further comprising inputting the trimmed nodal graph to reinforcement-learning based graphical neural network model.

In a tenth aspect, the method of the fourth aspect, wherein the first edge indicating that the moving agent is able to fulfill the request.

In an eleventh aspect, a system for managing moving agents comprises controllers associated with moving agents. The controllers are configured to identify goods agents and a plurality of requests within a threshold radius of the moving agents, determine one or more costs in association with the moving agents and the goods agents and the plurality of requests, generate a respective nodal graph specific to each of the moving agents, apply a reinforcement-learning based graphical neural network model to each respective nodal graph of the moving agents, and instruct one or more of the moving agents to satisfy at least one of the plurality of requests responsive to the applying of the reinforcement-learning based graphical neural network model.

In a twelfth aspect, the system of the eleventh aspect, wherein the moving agents are autonomous vehicle or human operated intelligent vehicles.

In a thirteenth aspect, the system of the eleventh or the twelfth aspect, wherein reinforcement learning based graphical neural network outputs the actions that maximize a number of requests to be satisfied by the moving agents.

In a fourteenth aspect, the location matching system of the eleventh to the thirteenth aspects, wherein the edges include a first edge between the vertex of a moving agent and the vertex of a request.

In a fifteenth aspect, the location matching system of any of the eleventh to the fourteenth aspects, wherein the edges include a second edge between the vertex of a request and a vertex of an additional request, the second edge indicating that a moving agent can fulfill both the request and the additional request.

In a sixteenth aspect, the location matching system of any of the eleventh to the fifteenth aspects, wherein the edges include a second edge between the vertex of a request and a vertex of an additional request, the second edge indicating that a moving agent can fulfill both the request and the additional request.

In a seventeenth aspect, the location matching system of any of the eleventh to the sixteenth aspects, wherein the edges include at least one third edge between the vertex of a moving agent and a vertex of a goods agent.

In an eighteenth aspect, the location matching system of any of the eleventh to the seventeenth aspects, wherein the controllers are further configured to trim the nodal graph based on constraints on goods of the goods agents and services of the requests.

In a nineteenth aspect, the location matching system of the eighteenth aspect, wherein the controllers are further configured to input the trimmed nodal graph to reinforcement-learning based graphical neural network model.

In a twentieth aspect, the landlord device of any of the fifteenth to the nineteenth aspects, further comprising receiving a selection of a property from the one or more recommended properties from the user, receiving a location of a vehicle of the user, and directing the vehicle to drive to the location.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method for managing moving agents, comprising:
identifying, by a controller of an autonomous vehicle, goods agents, moving agents, and a plurality of requests within a predetermined area;
generating, by the controller of the autonomous vehicle, a nodal graph including a plurality of vertices and a plurality of edges, the plurality of vertices including one or more vertices for the moving agents, one or more vertices for the requests, and one or more vertices for the goods agents, and each of the plurality of edges defining a relation between two vertices;
obtaining, by the controller of the autonomous vehicle, actions for the moving agents by inputting the nodal graph to a reinforcement learning based graphical neural network model stored in one of the moving agents, the reinforcement learning based graphical neural network model outputs the actions for the moving agents in response to receiving the nodal graph; and instructing, by the controller of the autonomous vehicle, the moving agents to autonomously drive based on the actions to satisfy at least one of the plurality of requests.

2. The method of claim 1, wherein the moving agents are autonomous vehicle or human operated intelligent vehicles.

3. The method of claim 1, wherein the reinforcement learning based graphical neural network model outputs the actions that maximize a number of requests to be satisfied by the moving agents.

4. The method of claim 1, wherein the edges include a first edge between a vertex of a moving agent and an additional vertex of a request.

5. The method of claim 1, wherein the edges include a second edge between a vertex of a request and an additional vertex of an additional request, the second edge indicating that a moving agent can fulfill both the request and the additional request.

6. The method of claim 1, wherein the edges include at least one third edge between a vertex of a moving agent and an additional vertex of a goods agent.

7. The method of claim 1, wherein the reinforcement learning based graphical neural network model outputs the actions that minimize a sum of freight delays, scheduled requests delays, and preference costs.

8. The method of claim 1, further comprising trimming the nodal graph based on constraints on goods of the goods agents and services of the requests.

9. The method of claim 8, further comprising inputting the trimmed nodal graph to the reinforcement learning based graphical neural network model.

10. The method of claim 4, wherein the first edge indicating that the moving agent is able to fulfill the request.

11. A system for managing moving agents, comprising:

controllers associated with the moving agents, each of the controllers configured to:

identify goods agents, the moving agents, and a plurality of requests within a predetermined area;

generate a nodal graph including a plurality of vertices and a plurality of edges, the plurality of vertices including one or more vertices for the moving agents, one or more vertices for the requests, and one or more vertices for the goods agents and each of the plurality of edges a defining relation between two vertices;

obtain actions for the moving agents by inputting the nodal graph to a reinforcement-learning based graphical neural network model stored in one of the moving agents, the reinforcement learning based graphical neural network model outputs the actions for the moving agents in response to receiving the nodal graph; and instruct the moving agents to autonomously drive based on the actions to satisfy at least one of the plurality of requests.

12. The system of claim 11, wherein the moving agents are autonomous vehicle or human operated intelligent vehicles.

13. The system of claim 11, wherein the reinforcement learning based graphical neural network model outputs the actions that maximize a number of requests to be satisfied by the moving agents.

14. The system of claim 11, wherein the edges include a first edge between a vertex of a moving agent and an additional vertex of a request.

15. The system of claim 11, wherein the edges include a second edge between a vertex of a request and an additional vertex of an additional request, the second edge indicating that a moving agent can fulfill both the request and the additional request.

16. The system of claim 11, wherein the edges include at least one third edge between a vertex of a moving agent and an additional vertex of a goods agent.

17. The system of claim 11, wherein the reinforcement learning based graphical neural network model outputs the actions that minimize a sum of freight delays, scheduled requests delays, and preference costs.

18. The system of claim 11, wherein the controllers are further configured to trim the nodal graph based on constraints on goods of the goods agents and services of the requests.

19. The system of claim 18, wherein the controllers are further configured to input the trimmed nodal graph to reinforcement learning based graphical neural network model.

20. The system of claim 14, wherein the first edge indicating that the moving agent is able to fulfill the request.

* * * * *